United States Patent
Lee (10) Patent No.: US 11,156,999 B2
(45) Date of Patent: Oct. 26, 2021

(54) GOLF CART SYSTEM CAPABLE OF AUTONOMOUS DRIVING BASED ON ACCURATE LOCATION INFORMATION AND METHOD OF CONTROLLING GOLF CART USING THE SYSTEM

(71) Applicant: TT & G Co., Ltd., Daegu (KR)

(72) Inventor: Bae hee Lee, Daegu (KR)

(73) Assignee: TT & G CO., LTD., Daegu (KR)

( * ) Notice: Subject to any disclaimer, the term of this patent is extended or adjusted under 35 U.S.C. 154(b) by 336 days.

(21) Appl. No.: 15/827,621

(22) Filed: Nov. 30, 2017

(65) Prior Publication Data
US 2019/0155274 A1   May 23, 2019

(30) Foreign Application Priority Data

Nov. 21, 2017  (KR) .................. 10-2017-0155334

(51) Int. Cl.
| | | |
|---|---|---|
| G05D 1/00 | (2006.01) | |
| G05D 1/02 | (2020.01) | |
| G01C 22/00 | (2006.01) | |
| A63B 55/60 | (2015.01) | |

(52) U.S. Cl.
CPC ........... *G05D 1/0022* (2013.01); *A63B 55/61* (2015.10); *G01C 22/004* (2013.01); *G05D 1/0214* (2013.01); *G05D 1/0272* (2013.01); *G05D 1/0278* (2013.01); *A63B 2055/605* (2015.10); *A63B 2220/12* (2013.01); *A63B 2220/20* (2013.01); *A63B 2220/833* (2013.01); *A63B 2225/50* (2013.01); *G05D 2201/0204* (2013.01)

(58) Field of Classification Search
None
See application file for complete search history.

(56) References Cited

U.S. PATENT DOCUMENTS

| | | | |
|---|---|---|---|
| 5,295,551 A * | 3/1994 | Sukonick | B62D 1/28 180/167 |
| 6,404,159 B1 * | 6/2002 | Cavallini | B60L 3/0015 318/587 |
| 9,393,981 B1 * | 7/2016 | Lee | B62B 5/0076 |
| 9,869,999 B2 * | 1/2018 | Doane | G05D 1/0212 |
| 2002/0044086 A1 * | 4/2002 | Boman | A63B 24/0021 342/357.34 |

(Continued)

FOREIGN PATENT DOCUMENTS

| | | |
|---|---|---|
| KR | 2003-0000733 A | 1/2003 |
| KR | 10-1436068 B1 | 8/2014 |

(Continued)

*Primary Examiner* — Nicholas K Wiltey
*Assistant Examiner* — Tiffany K Luu
(74) *Attorney, Agent, or Firm* — Hauptman Ham, LLP (57) ABSTRACT

A golf cart system for enabling a golf cart to autonomously operate includes a cart main body, a control module, a server, and a terminal. More specifically, when the terminal deviates from its original location where transmission and reception to and from a golf cart are performed or the terminal deviates from a driving restricted area or driving area within a driving area set in the golf cart, the golf cart is automatically stopped. When the terminal enters the driving area again, an accurate location of the terminal is confirmed using a distance value having a minimized error range using a trilateration algorithm, and the golf cart can move rapidly.

5 Claims, 8 Drawing Sheets

(56) References Cited

U.S. PATENT DOCUMENTS

| | | | | |
|---|---|---|---|---|
| 2004/0260467 A1* | 12/2004 | Wehrlen | ............... | G05D 1/0291 701/36 |
| 2009/0248231 A1* | 10/2009 | Kamiya | ............... | G05D 1/0061 701/23 |
| 2011/0210887 A1* | 9/2011 | Eisen | ..................... | G01S 5/06 342/357.25 |
| 2017/0050659 A1* | 2/2017 | Cardano | ............... | B62B 5/0069 |
| 2019/0137617 A1* | 5/2019 | Chapuis | ................ | G01S 11/00 |

FOREIGN PATENT DOCUMENTS

| | | | |
|---|---|---|---|
| KR | 10-1468870 | B1 | 12/2014 |
| KR | 101468870 | B1 * | 12/2014 |

* cited by examiner

```
float anchor0[]={0, 0};
float anchor1[]={25, 25*sqrt(3)};
float anchor2[]={50, 0};

float T1 = 0;
float T2 = 0;
float T3 = 0;

float tag_X=0;
float tag_Y=0;
float Angle=0;

T1 = tmp_A0 + 50;  // tmp_A0(R1) : Distance between Tag - Anchor0
T2 = tmp_A1 + 50;  // tmp_A1(R2) : Distance between Tag - Anchor1
T3 = tmp_A2 + 50;  // tmp_A2(R3) : Distance between Tag - Anchor2
int n = 0;

// Error correction on R1
while(T1<tmp_A1 && n<10){
    tmp_A0 = tmp_A0 + 1;
    T1 = tmp_A0 + 50;
    n++;
}
n = 0;
while(T1<tmp_A2 && n<10){
    tmp_A0 = tmp_A0 + 1;
    T1 = tmp_A0 + 50;
    n++;
}

// Error correction on R2
n = 0;
while(T2<tmp_A0 && n<10){
    tmp_A1 = tmp_A1 + 1;
    T2 = tmp_A1 + 50;
    n++;
}
n = 0;
while(T2<tmp_A2 && n<10){
    tmp_A1 = tmp_A1 + 1;
    T2 = tmp_A1 + 50;
    n++;
}
    n = 0;

// Error correction on R3
while(T3<tmp_A0 && n<10){
    tmp_A2 = tmp_A2 + 1;
    T3 = tmp_A2 + 50;
    n++;
}
n = 0;
while(T3<tmp_A1 && n<10){
    tmp_A2 = tmp_A2 + 1;
    T3 = tmp_A2 + 50;
    n++;
}

// Calculation of X and Y
tag_X = (pow(tmp_A0,2) - pow(tmp_A2,2) + pow(anchor2[0],2))/(2*anchor2[0]);
tag_Y = (pow(tmp_A2,2) - pow(tmp_A1,2) - pow(anchor2[0],2) + pow(anchor1[0],2)+pow(anchor1[1],2))/*
(2*anchor1[1])  +  (2*anchor2[0]  -  2*anchor1[0])  +  (pow(tmp_A0,2)  -  pow(tmp_A2,2)  +
pow(anchor2[0],2))/*
(4*anchor2[0]*anchor1[1]);
// Calculation of Angle
Angle = atan2( tag_Y, tag_X );
Angle = Angle * 180 / 3.14;
```

GOLF CART SYSTEM CAPABLE OF AUTONOMOUS DRIVING BASED ON ACCURATE LOCATION INFORMATION AND METHOD OF CONTROLLING GOLF CART USING THE SYSTEM

CROSS REFERENCE TO RELATED APPLICATION

The present application claims the benefit of Korean Patent Application No. 10-2017-0155334 filed in the Korean Intellectual Property Office on Nov. 21, 2017, the entire contents of which are incorporated herein by reference.

BACKGROUND OF THE INVENTION

1. Technical Field

The present invention relates to a golf cart system capable of autonomous driving based on accurate location information and a method of controlling a golf cart using the system and, more particularly, to a technology regarding a golf cart system capable of autonomous driving based on accurate location information and a method of controlling a golf cart using the system, wherein a golf cart tracks a terminal carried by a golfer in real time based on information about a golf course field divided into a driving area and a driving restricted area, which is received from a server in real time and stored in a memory unit, determines the accurate location value of the terminal through a trilateration algorithm when the terminal enters the driving area after it deviates from the first location of the terminal or the driving area, and sets the shortest distance path, thereby being capable of autonomous driving.

2. Description of the Related Art

In general, an autonomous driving golf cart carries a golf bag or a load in a golf course, automatically recognizes a golfer or a terminal carried by a golfer, and operates while maintaining a set interval at the back.

A golf cart and a golfer or a terminal carried by a golfer transmits and receives a location based on GPSs. In this case, a malfunction is generated or a location is not rapidly confirmed because the golf cart does not recognize the accurate location of the terminal. Accordingly, the golf cart is not rapidly moved due to buffering.

Recently, the location of a golfer or terminal is accurately calculated using various methods so that a golf cart can rapidly move toward the golfer or terminal based on the calculated result value.

Conventional technologies are described below. Korean Patent No. 10-1468870 discloses a technology regarding a wireless control cart control system for a golf field using a location measurement system based on an RF transmission speed, including a remocon equipped with a distance measurement module for measuring the distance based on the transmission speed of an RF signal, a cart, at least three fixed nodes, and a location calculation node. The remocon and the cart transmit an RF signal. The at least three fixed nodes receive the RF signal transmitted by the remocon and the cart and transmits the arrival time of the measured RF signal to the location calculation node. The location calculation node transmits information about the locations of the remocon and the cart, calculated based on the arrival time of the RF signal, to the remocon and the cart. In order to calculate a distance and direction for the remocon based on the location information and track the remocon while maintaining a predetermined setting interval from the remocon, the cart includes a golf bag loading unit, a transport unit including a golfer boarding unit, a driving unit including a front-wheel drive motor, left rear-wheel drive motor and right rear-wheel drive motor in order to transport the transport unit, a sensor unit including at least four proximity sensors for sensing an obstacle in all directions and a tilt sensor for measuring a tilt angle, a distance measurement module for measuring the distance based on the transmission speed of the RF signal, a controller for controlling the driving unit based on the location information of the remocon received from the distance measurement module, the sensed signal or location information of the sensor unit and a sensed signal, a wireless communication unit for exchanging location and driving path information with another cart, and a camera module for photographing the surroundings of the remocon by tracking the remocon using the location information of the remocon so that a swing motion of a golfer is displayed. The controller of the cart performs control so that a collision between carts is avoided based on information about the location and driving path of another cart, provides a distance from a hole and the remocon based on the location value of a corresponding hole in each course of a previously stored golf course and the location information value of the remocon, and provides a function for recommending the type of a golf club based on the distance from the hole and the remocon, and neglects the location information and the sensed signal when the location control signal of the remocon is received and first controls the driving unit in response to the location control signal of the remocon.

Korean Patent Application Publication No. 10-2003-0000733 discloses a technology regarding an automatic location control electric cart system for a golf course, including an electric cart adapted to load golf equipment, a main device mounted on the electric cart and adapted to determine the current location based on received GPS information and to control the driving of the electric cart in response to the determined location, and a portable remote controller adapted to wirelessly communicate with the main device so that when a user wears the portable remote controller and an automatic mode is set, the electric cart can drive to track the user while maintaining a specific distance from the user.

Korean Patent No. 10-1436068 discloses a technology regarding a cart for a golf course, including a short distance communication unit for receiving information about the current location of a customer terminal from the customer terminal by performing short distance wireless communication with at least one customer terminal, a player location confirmation unit for confirming the current location of each player using the current location information of the customer terminal received through the short distance communication unit, a GPS reception unit for receiving GPS information from satellites, a cart location confirmation unit for confirming the current location of the cart using the GPS information, a user tracking unit for calculating the distance between the cart and each player using the current location of the cart and the current location of each player, outputting a movement instruction if the distance between the cart and a movement reference is a first setting distance reference or more, but not giving a movement instruction if the distance is the first setting distance reference or less, and outputting a stop instruction if the distance is a second setting distance reference when the cart moves in response to the movement instruction, and a movement unit for moving the cart in response to the movement instruction and stopping the cart in response to a stop instruction. The movement reference is a target or location along which the cart will follow. The distance reference is a threshold distance by which whether the cart will move is determined. The first setting distance reference is the second setting distance reference or more. The user tracking unit calculates the distance between the movement reference and the cart every set period time and determines whether or not to output a movement instruction.

The conventional technologies are focused on a technology in which the golf cart recognizes a golfer or a terminal carried by the golfer and tracks the golfer or terminal in real time. However, a golfer or a terminal carried by the golfer is tracked in real time. The conventional technologies have problems in that when the golfer or the terminal carried by the golfer enters a driving area again after deviating from a driving restricted area, some time is taken for the golf cart to confirm the location of the golfer or terminal and there is a difficulty in confirming an accurate location.

SUMMARY OF THE INVENTION

The present invention has been made keeping in mind the above problems occurring in the prior art, and an object of the present invention is to provide a golf cart system capable of autonomous driving based on accurate location information and a method of controlling a golf cart using the system, wherein the golf cart system operates in an unmanned manner while maintaining a specific distance from a golfer and rapidly confirms an accurate location of a terminal carried by the golfer through a trilateration algorithm when the terminal enters a driving area again after the golfer deviates from the first location of the terminal or a driving area set in the golf cart so that the golf cart can drive toward the terminal, thereby being capable of rapidly confirming an accurate location of the golf cart, solving inconvenience of the golfer, and improving accuracy in driving the golf cart.

An embodiment of the present invention provides a golf cart system capable of autonomous driving based on accurate location information, including a cart main body 100 automatically driven by a control module 200; a control module 200 including a collision prevention sensor 210 configured to prevent a collision by recognizing a target, a GPS sensor 220 configured to provide location information of the cart main body 100, a slope sensor 230 configured to recognize and control a slope, a memory unit 240 configured to store field information of a driving area and driving restricted area of a golf course, a tracking unit 250 configured to track a terminal 400 in real time, a control unit 260 configured to receive location information of the terminal 400, to calculate a distance from the terminal 400 based on the field information of the golf course stored in the memory unit 240 and to control a movement of the cart main body 100, a communication module 270 for transmission and reception with the terminal 400, and a distance measurement unit 290 configured to measure a distance between the control module 200 and the terminal 400; a server 300 transmitting the field information of the golf course to the memory unit 240; and the terminal 400 operating in conjunction with the control module 200 selectively or in real time. Three or more fixed nodes 120 are configured at locations spaced apart from one another on one side of the cart main body 100 and are connected to the control module 200, wherein the fixing node 120 is the reference of coordinates. The distance measurement unit 290 sequentially calculates the distance between each of the fixed nodes 120 and the terminal 400, calculates an x,y coordinate value of the terminal 400 by substituting a trilateration algorithm into the x,y coordinate value, determines the x,y coordinate value to be the location values of the terminal 400, calculates a distance l and angle Θ between the location value of the terminal 400 and the fixed node 120 of the reference, and transmits a result of the calculation to the control module 200 so that the cart main body 100 autonomously drives.

When the terminal 400 transmits PING, the control module 200 receives PONG and retransmits PING if the number of checked fixed nodes 120 after PONG timeout of 100 ms is less than 3, and switches to a round robin state if the number of checked fixed nodes 120 after PONG timeout of 100 ms is 3 or more, the distance measurement unit 290 is configured to sequentially calculate a coordinate value or distance between the terminal 400 and each of the fixed nodes 120 in the round robin state. The terminal 400 transmits POLL to the control module 200, receives POLL_ACK from the control module 200, and if POLL_ACK is not received within 10 ms after POLL is transmitted, timeout is generated and round robin is restarted. The terminal 400 receives RANGE_REPORT after transmitting RANGE to the control module 200, and if RANGE_REPORT is not received within 10 ms after transmitting RANGE, timeout is generated and round robin is restarted.

The fixed nodes 120 are divided and disposed at coordinates x,y. The fixed nodes include a first fixed node 121 having the x,y coordinate value of 0,0 and being a reference point determining the distance l and angle Θ between the terminal 400 and the cart main body 100, a second fixed node 123 having the x,y coordinate value of 25, 25 √3, and a third fixed node 125 having the x,y coordinate value 50,0. The first fixed node 121 is defined by x,y=x1,y1, the second fixed node 123 is defined by x,y=x2,y2, and the third fixed node 125 is defined by x,y=x3,y3. The calculation formula of the trilateration algorithm of the distance measurement unit 290 is:

$$R1=\sqrt{(x-x_1)^2+(y-y_1)^2}$$

$$R2=\sqrt{(x-x_2)^2+(y-y_2)^2}$$

$$R3=\sqrt{(x-x_3)^2+(y-y_3)^2}$$

The distance l and angle Θ between the first fixed node 121 and the terminal 400, which are location references of the cart main body 100, are determined by substituting the distance values R1, R2 and R3 of the first, second and third fixed nodes 121, 123 and 125 and the terminal 400 into the calculation formula of the trilateration algorithm.

An x,y value is calculated using the distance values R1, R2 and R3 between the first, second and third fixed nodes 121, 123 and 125 and the terminal 400, an error range is corrected using the x,y value, and the corrected value of the error range is substituted into the trilateration algorithm.

When the terminal 400 carried by a golfer deviates from a set driving area, the cart main body 100 is automatically stopped. When the terminal 400 carried by the golfer enters the driving area, the control module 200 recognizes a request from the golfer or automatically recognizes a signal from the terminal 400, and drives the cart main body 100 toward the terminal 400. If a single terminal 400 is used and the number of cart main bodies 100 driven by golfers is plural, the cart main bodies 100 are sequentially driven in order of closer cart main body 100.

An app 410 for controlling the cart main body 100 automatically or manually is installed in the terminal 400. The app 410 includes a boarding driving mode 411 in which a golfer can drive the cart main body 100 after boarding the cart main body 100, a terminal driving mode 413 in which the cart main body 100 is manually manipulated, a first tracking driving mode 415 in which the control module 200 recognizes the terminal 400 and tracks the terminal 400 in real time so that the terminal can be driven at the back by a set distance, and a second tracking driving mode 417 in which when the terminal 400 makes a request or a golfer who carries the terminal 400 enters a driving area from a driving restricted area, the control module 200 recognizes the request or entry and tracks the terminal 400.

The cart main body 100 includes a pair of wheels spaced apart from each other at a specific interval and configured at each of the front and rear of the cart main body 100, a motor drive 110 driven under the control of the control unit 260 and configured on one side of the inside of the cart main body 100, and left and right motors 111 and 113 connected to the respective wheels configured at the front. The control unit 260 controls the motor drive 110 through RS485 communication.

A method is performed by the golf cart system, and includes a storage step S100 of storing information of a field divided into a driving area and driving restricted area of a golf course and received from the server 300 in the memory unit 240; a terminal registration step S200 of selectively registering the terminal 400 capable of operating in conjunction with the control module 200 of the cart main body 100 and having the app 410 configured to select any one of the boarding driving mode 401a, the terminal driving mode 401b, the first tracking driving mode 401c and the second tracking driving mode 401d installed in the terminal 400 with the control module 200 of the cart main body 100; a cart control setting step S300 of selecting one of the modes using the app 410 of the terminal 400; and a cart control step S400 of controlling the cart main body 100 by the control module 200 according to a mode set in the cart control setting step S300.

In the cart control step S400, when the golfer or the terminal 400 deviates from the driving restricted area, the cart main body 100 is automatically stopped. When the golfer or the terminal 400 enters the driving area, the golfer manually drives the cart main body 100 or the control module 200 recognizes the terminal 400 and automatically drives the cart main body 100.

In the storage step S100, when information about the driving area or driving restricted area is suddenly changed, the changed field information is received from the server 300 and stored in real time.

<Description of reference numerals>

100: cart main body
110: motor drive
111: left motor
113: right motor
120: fixed node
121: first fixed node
123: second fixed node
125: third fixed node
200: control module
210: collision prevention sensor
220: GPS sensor
230: slope sensor
240: memory unit
250: tracking unit
260: control unit
270: communication module
290: distance measurement unit
300: server
400: terminal
410: app
411: boarding driving mode
413: terminal driving mode
415: first tracking driving mode
417: second tracking driving mode
l: distance
Θ: angle
R1: distance between first fixed node and terminal
R2: distance between second fixed node and terminal
R3: distance between third fixed node and terminal
S100: storage step
S200: registration step
S300: cart control setting step
S400: cart control step

DETAILED DESCRIPTION

The present invention provides a golf cart system capable of autonomous driving based on accurate location information and a method of controlling a golf cart using the system, wherein a golf cart tracks a terminal carried by a golfer in real time based on information about a golf course field divided into a driving area and a driving restricted area, which is received from a server in real time and stored in a memory unit, determines the accurate location value of the terminal through a trilateration algorithm when the terminal enters the driving area after it deviates from the first location of the terminal or the driving area, and sets the shortest distance path, thereby being capable of autonomous driving.

Hereinafter, the configuration and operation of the golf cart system for achieving the object according to an embodiment of the present invention is described with reference to FIGS. 1 to 8.

First, the construction of the golf cart system is described prior to a description of the golf cart system. As shown in FIGS. 1 to 5, the golf cart system includes a cart main body 100 automatically driven by a control module 200; a control module 200 including a collision prevention sensor 210 configured to prevent a collision by recognizing a target, a GPS sensor 220 configured to provide location information of the cart main body 100, a slope sensor 230 configured to recognize and control a slope, a memory unit 240 configured to store field information of a driving area and driving restricted area of a golf course, a the tracking unit 250 configured to track a terminal 400 in real time, a control unit 260 configured to receive location information of the terminal 400, to calculate a distance from the terminal 400 based on the field information of the golf course stored in the memory unit 240 and to control a movement of the cart main body 100, a communication module 270 for transmission and reception with the terminal 400, and a distance measurement unit 290 configured to measure a distance between the control module 200 and the terminal 400; a server 300 transmitting the field information of the golf course to the memory unit 240; and the terminal 400 operating in conjunction with the control module 200 selectively or in real time. Three or more fixed nodes 120 are configured at locations spaced apart from one another on one side of the cart main body 100 and are connected to the control module 200, wherein the fixing node 120 is the reference of coordinates. The distance measurement unit 290 sequentially calculates the distance between each of the fixed nodes 120 and the terminal 400, calculates an x,y coordinate value of the terminal 400 by substituting a trilateration algorithm into the x,y coordinate value, determines the x,y coordinate value to be the location values of the terminal 400, calculates a distance l and angle Θ between the location value of the terminal 400 between the location value of the terminal 400 and the fixed node 120 of the reference, and transmits a result of the calculation to the control module 200. Accordingly, the cart main body 100 autonomously drives.

Figure 2:
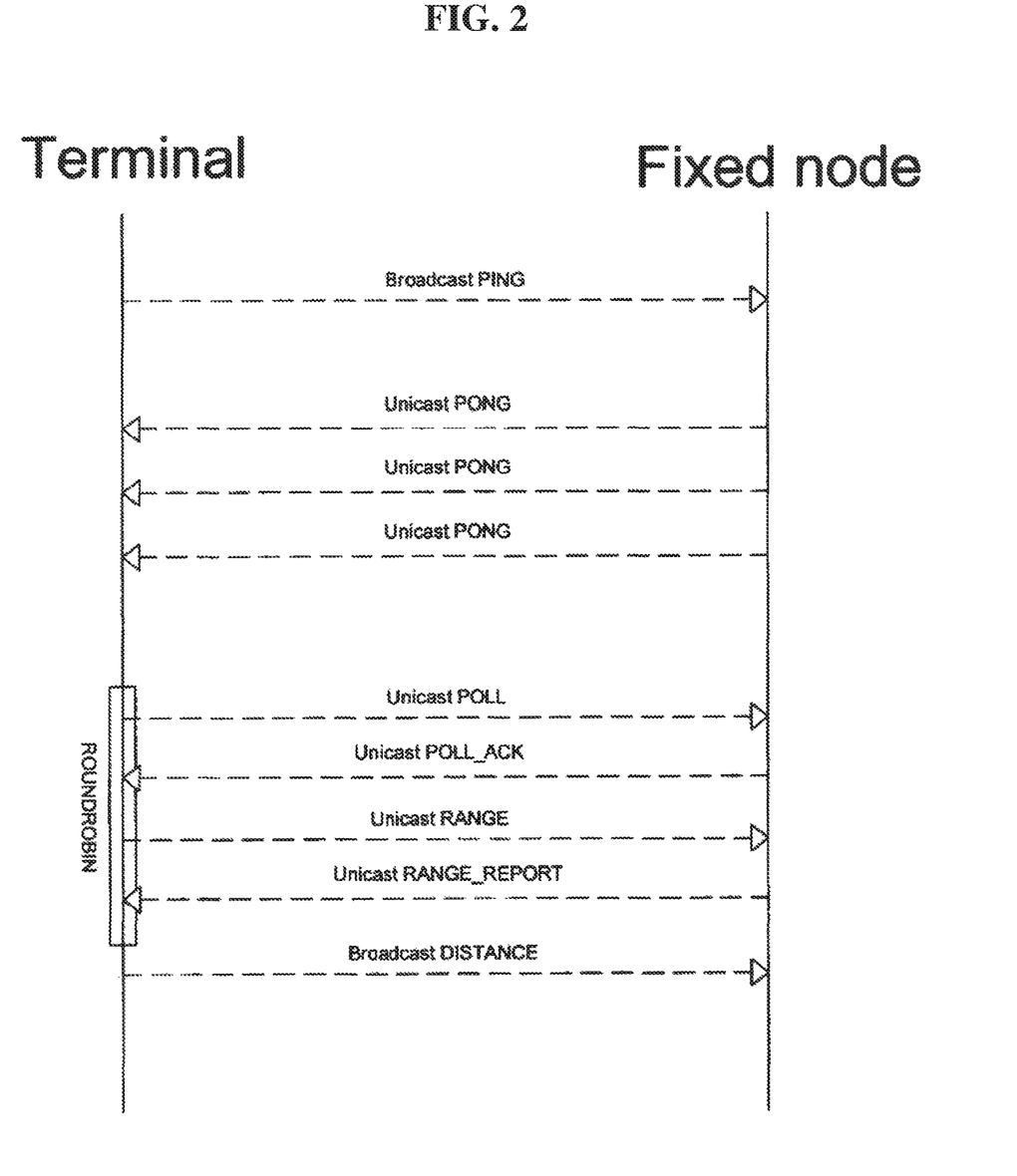
FIG. 2 is a diagram showing a communication method between a terminal and a golf cart according to an embodiment of the present invention.

In this case, as shown in FIG. 2, when the terminal 400 transmits PING, the control module 200 receives PONG and retransmits PING if the number of checked fixed nodes 120 after PONG timeout of 100 ms is less than 3, and switches to a round robin state if the number of checked fixed nodes 120 after PONG timeout of 100 ms is more 3 or more, the distance measurement unit 290 is configured to sequentially calculate a coordinate value or distance between the terminal 400 and each of the fixed nodes 120 in the round robin state. The terminal 400 transmits POLL to the control module 200, receives POLL_ACK from the control module 200, and if POLL_ACK is not received within 10 ms after POLL is transmitted, timeout is generated and round robin is restarted. The terminal 400 receives RANGE_REPORT after transmitting RANGE to the control module 200, and if RANGE_REPORT is not received within 10 ms after transmitting RANGE, timeout is generated and round robin is restarted.

That is, after transmitting POLL, the control module 200 receives POLL_ACK and calculates a time lag, receives RANGE_REPORT after transmitting RANGE and calculates a time lag, and calculates the distance using time information.

In other words, the distance measurement unit 290 continues to perform transmission and reception along with the terminal 400. If there is response from the terminal 400, the distance measurement unit 290 is restarted, thereby being capable of rapid processing.

Figure 5:
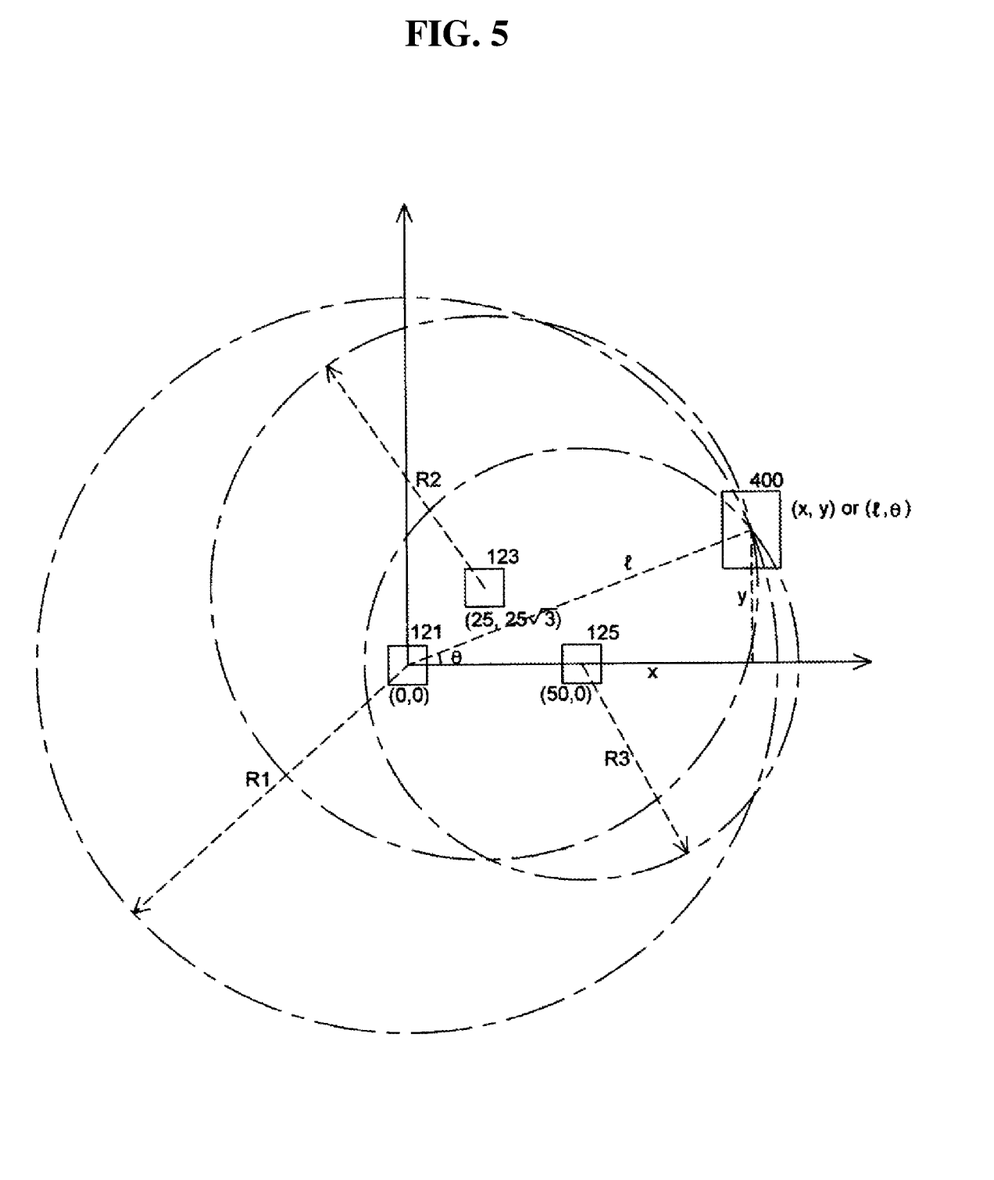
FIG. 5 is a diagram showing the concept of a trilateration algorithm according to an embodiment of the present invention.

As shown in FIG. 2 or 5, the fixed nodes 120 are divided and disposed at coordinates x,y. The fixed nodes include a first fixed node 121 having the x,y coordinate value of 0,0 and being a reference point determining the distance l and angle Θ between the location value of the terminal 400 between the terminal 400 and the cart main body 100, a second fixed node 123 having the x,y coordinate value of 25, 25 √3, and a third fixed node 125 having the x,y coordinate value 50,0. The first fixed node 121 is defined by x,y=x1,y1, the second fixed node 123 is defined by x,y=x2,y2, and the third fixed node 125 is defined by x,y=x3,y3. The calculation formula of the trilateration algorithm of the distance measurement unit 290 is:

$$R1 = \sqrt{(x-x_1)^2 + (y-y_1)^2}$$

$$R2 = \sqrt{(x-x_2)^2 + (y-y_2)^2}$$

$$R3 = \sqrt{(x-x_3)^2 + (y-y_3)^2}$$

The distance l and angle Θ between the first fixed node 121 and the terminal 400, which are location references of the cart main body 100, are determined by substituting the distance values R1, R2 and R3 of the first, second and third fixed nodes 121, 123 and 125 and the terminal 400 into the calculation formula of the trilateration algorithm.

In this case, the calculation formula for calculating the distance l and angle Θ between the location value of the terminal 400 between the first fixed node 121 and the terminal 400 is $$\ell = \sqrt{x^2 + y^2}, \; \Theta = \arctan\left(\frac{y}{x}\right).$$

In this case, R1 is the distance between the first fixed node 121 and the terminal 400, R2 is the distance between the second fixed node 123 and the terminal 400, and R3 is the distance between the third fixed node 125 and the terminal 400.

Figure 6:
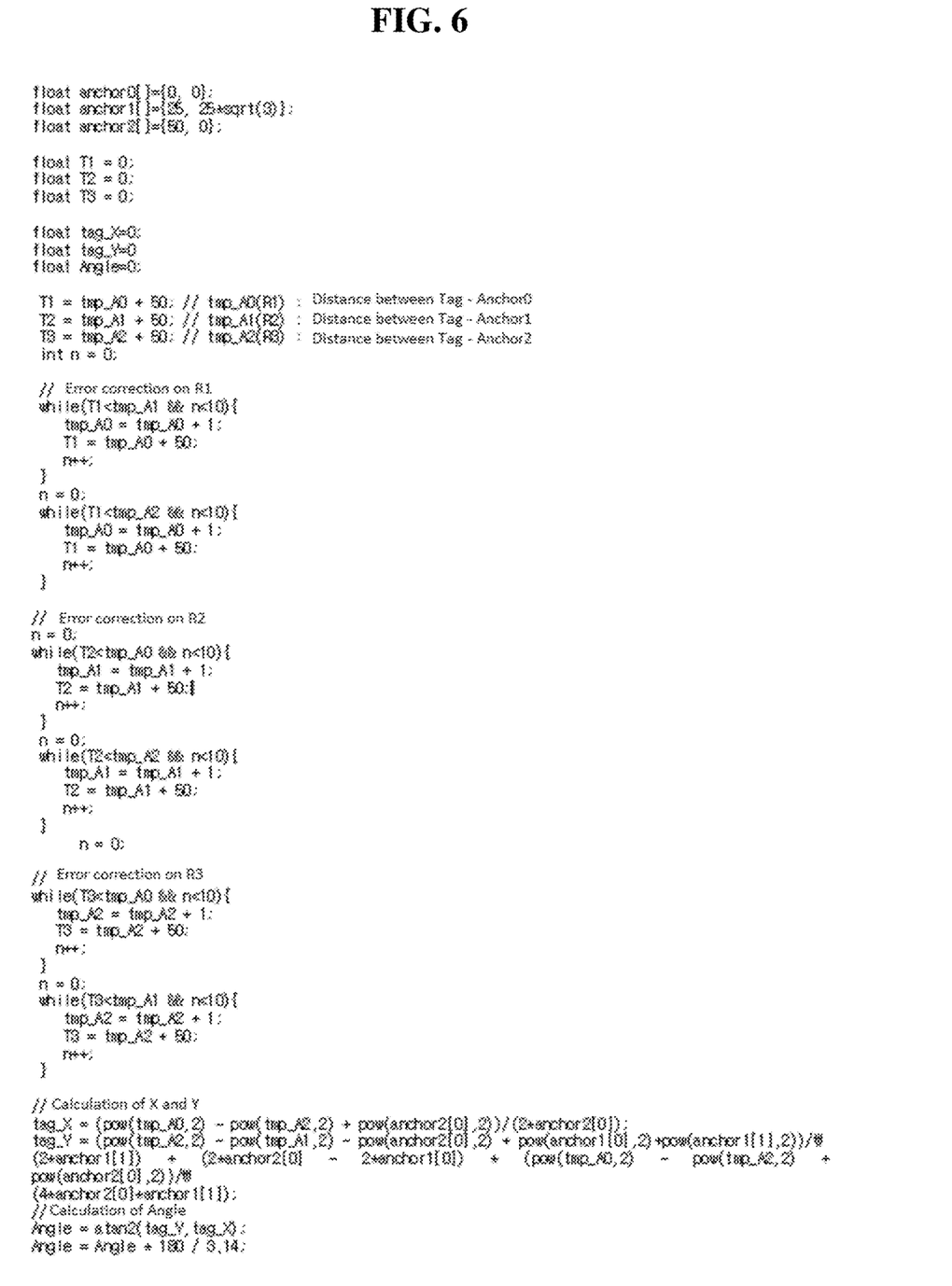
FIG. 6 is a diagram showing the trilateration algorithm and a program script for correcting an error range according to an embodiment of the present invention.

As shown in FIG. 6, an x,y value is calculated using the distance values R1, R2 and R3 between the first, second and third fixed nodes 121, 123 and 125 and the terminal 400, an error range is corrected using the x,y value, and the corrected value of the error range is substituted into the trilateration algorithm.

In a conventional technology, the location of a terminal is confirmed using a triangulation algorithm not the trilateration algorithm, and the cart main body is then driven. There are problems in that it is difficult to accurately confirm the location of the terminal and a lot of time is taken. In an embodiment of the present invention, after the distances R1, R2 and R3 between the first, second and third fixed nodes 121, 123 and 125 and the terminal 400 are measured, the error range of a distance value is minimized through a program script included in the distance measurement unit 290. The distance l and angle Θ between the first fixed node 121 and the terminal 400 are determined by substituting the minimized error range into the calculation formula of the trilateration algorithm, thereby being capable of improving accuracy.

In this case, in using the golf cart system according to an embodiment of the present invention, when the terminal 400 carried by a golfer deviates from a set driving area, the cart main body 100 is automatically stopped. When the terminal 400 carried by the golfer enters the driving area, the control module 200 recognizes a request from the golfer or automatically recognizes a signal from the terminal 400, and drives the cart main body 100 toward the terminal 400. If a single terminal 400 is used and the number of cart main bodies 100 driven by golfers is plural, the cart main bodies 100 are sequentially driven in order of closer cart main body 100. Accordingly, a congestion and collision between the cart main bodies 100 can be prevented.

Furthermore, if necessary, only a specific cart may be selected and driven, but the present invention is not limited thereto.

That is, in accordance with an embodiment of the present invention, the terminal 400 carried by a golfer performs transmission and reception with the control module 200 of the cart main body 100 in real time, and the cart main body 100 moves at the back of the terminal 400 while maintaining a set distance from the terminal 400. When the terminal 400 owned by the golfer deviates from a driving area stored in the control module 200, the control module 200 stops the cart main body 100. When the terminal 400 enters the driving area again, the control module 200 controls the cart main body 100 so that the cart main body operates through transmission and reception between the control module 200 and the terminal 400. Accordingly, the control module 200 can accurately confirm location information of the terminal 400, so the cart main body 100 can move rapidly and accurately.

Figure 7:
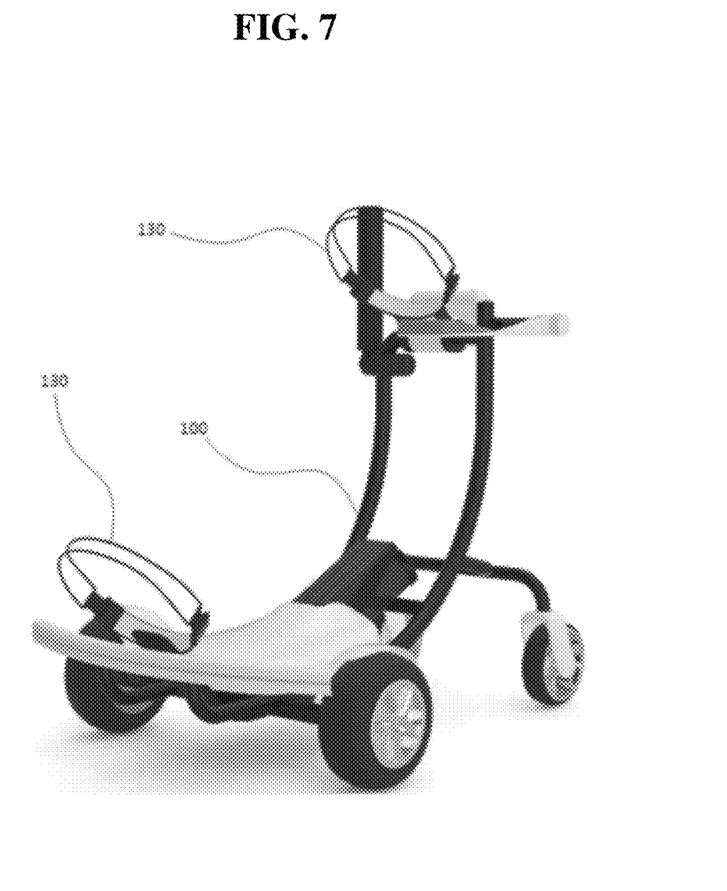
FIG. 7 is a perspective view showing the golf cart according to an embodiment of the present invention.

As shown in FIG. 7, the cart main body 100 is configured to automatically operate by the control module 200 and to have an external appearance similar to a common golf cart. The cart main body 100 includes a pair of wheels spaced apart from each other at a specific interval and configured at each of the front and rear of the cart main body 100. The cart main body 100 includes a motor drive 110 driven under the control of the control unit 260 and configured on one side of the inside of the cart main body 100. The cart main body 100 includes left and right motors 111 and 113 connected to the respective wheels configured at the front. The control unit 260 controls the motor drive 110 through RS485.

Figure 3:
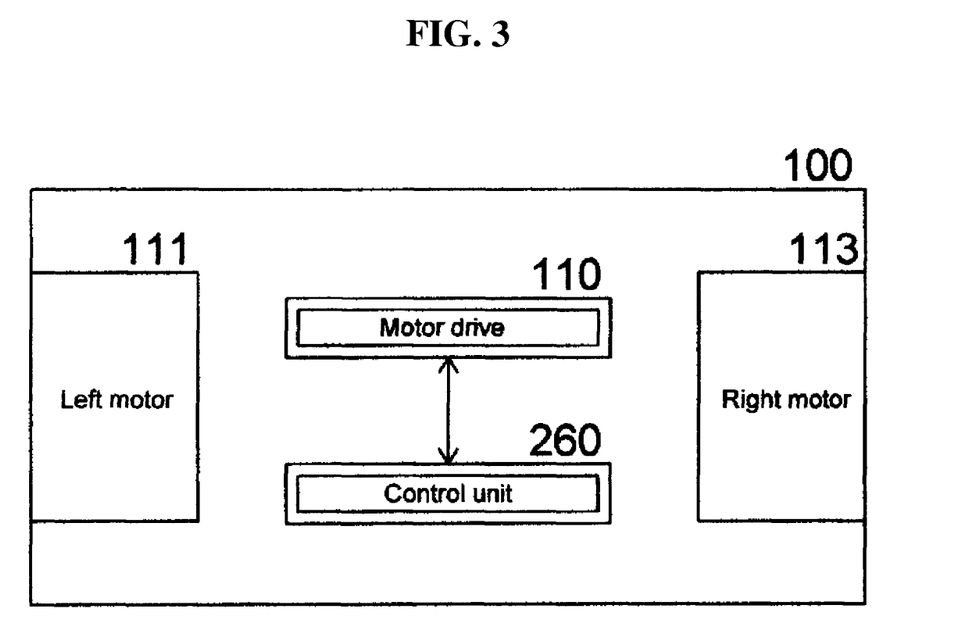
FIG. 3 is a diagram showing the golf cart and a motor drive according to an embodiment of the present invention.
Figure 4:
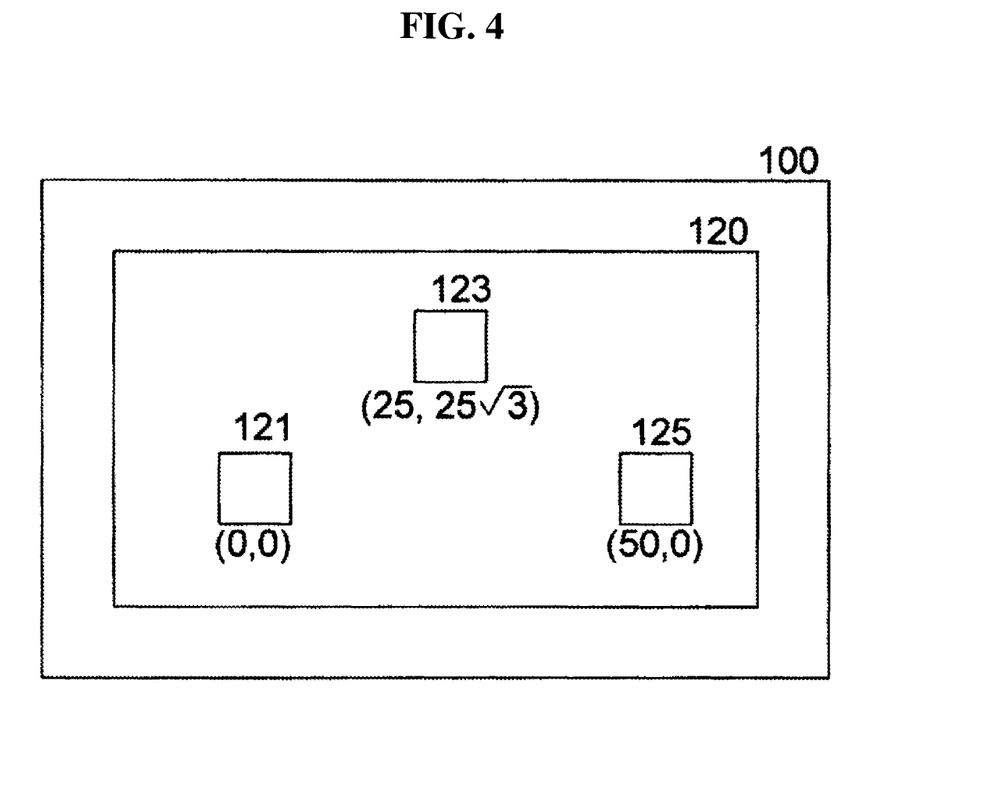
FIG. 4 is a diagram showing the golf cart and a fixed node according to an embodiment of the present invention.

That is, as shown in FIG. 3, the motor drive 110 controls the left motor 111 or the right motor 113 in response to a command from the control unit 260, thereby enabling creativity in a direction change.

Furthermore, as shown in FIG. 7, a fastening unit 130 is configured on each of one side and the other side over the cart main body 100 and configured to fasten both sides of the outside of a golf bag while surrounding the golf bag. Accordingly, the golf bag can be stably fixed.

The fastening unit 130 has an effect in that it can be used regardless of the size of a golf bag because it can be fastened and unfastened.

Figure 1:
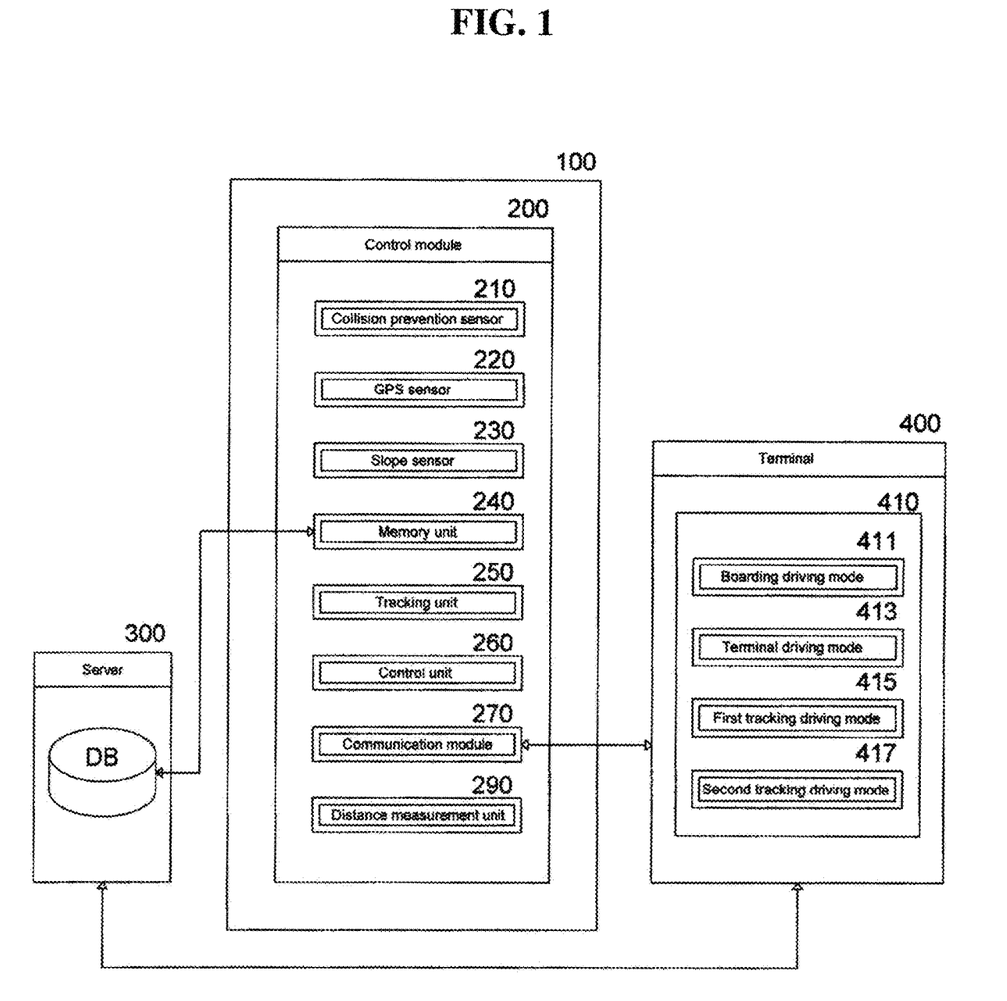
FIG. 1 is a block diagram showing a golf cart system according to an embodiment of the present invention.

The control module 200 includes the collision prevention sensor 210, the GPS sensor 220, the slope sensor 230, the memory unit 240, the tracking unit 250, the control unit 260, the communication module 270 and the distance measurement unit 290.

The collision prevention sensor 210 prevents a collision by recognizing a target. In driving the cart main body 100 of the control module 200, the collision prevention sensor 210 can prevent the cart main body 100 from moving to a driving restricted area, such as the bunker, hazard or dangerous area of a golf course field. The target may be a golfer.

In other words, the collision prevention sensor 210 can prevent the cart main body 100 from being damaged.

The GPS sensor 220 provides information about the location of the cart main body 100, and can transmit the location of the cart main body 100 to the terminal 400. If necessary, the GPS sensor 220 may be configured to transmit the location of the golf cart to the control unit of a golf course connected through communication means.

The slope sensor 230 may support the prevention of an accident attributable to a slope and a safe movement by recognizing the locations of a field having a slope other than a flatland when the cart main body 100 operates within the range of a driving area based on field information of the golf course.

The memory unit 240 stores field information, including the driving area and driving restricted area of a golf course first received from a server 300. The memory unit 240 stores field information of a golf course along which the golf cart operates from the first request of a golfer or from a company that lends or provides the golf cart. The golf cart can be actively driven into the driving area by the control module 200 based on the stored field information. In the case of a driving restricted area, the memory unit 240 plays the role of a navigator for moving the golf cart by making a detour around the driving restricted area.

In this case, the memory unit 240 first stores field information of a golf course from the server 300. If the field information of the golf course is suddenly changed, the memory unit receives and stores the changed field information of the golf course in real time. Accordingly, the control module 200 may control the golf cart 100 using the changed field information of the golf course stored in the memory unit 240.

That is, a site situation that occurs suddenly can be immediately handled because the changed field information of the golf course is received in real time.

The tracking unit 250 tracks the terminal 400. The control unit 260 substantially controls all of the elements included in the control module 200. The control unit 260 receives information about the location of the terminal 400, calculates a distance from the terminal 400 based on corresponding field information of a golf course stored in the memory unit 240, and controls a movement of the cart main body 100 based on the calculated distance.

Furthermore, the communication module 270 is used for transmission and reception to and from the terminal 400, and is communication means between the terminal 400 and the control module 200.

That is, the distance measurement unit 290 has been described in detail prior to the description of the control module 200 and other elements are elements configured in a common golf cart capable of autonomous driving, and thus a detailed description thereof is omitted.

The server 300 is a separate element as shown in FIG. 1. The server 300 provides the memory unit 240 of the control module 200 with information about a golf course in which the cart main body 100 must be driven, that is, information that suggests a driving area and a driving restricted area, in order to help the safe driving of the cart main body 100 by the control module 200 based on the golf course field information.

In this case, when a golfer carries the terminal 400 and uses the cart main body 100, if field information of a golf course is suddenly changed, the server 300 transmits the suddenly changed field information to the memory unit 240 of the control module 200 in real time. Accordingly, the cart main body 100 can immediately handle a suddenly varying or generated situation.

That is, the server 300 may be a website managed by a golf course and may be a part included in a control unit including the control system of a golf course.

As shown in FIG. 1, the terminal 400 is the same machine device as a common smartphone. Various communication methods may be applied to the terminal 400, and the terminal 400 is basically configured to operate in conjunction with the control module 200 for controlling the cart main body 100.

In this case, an app 410 for controlling the cart main body 100 automatically or manually is installed in the terminal 400.

The app 410 includes a boarding driving mode 411 in which a golfer can drive the cart main body 100 after boarding the cart main body 100, a terminal driving mode 413 in which the cart main body 100 is manually manipulated, a first tracking driving mode 415 in which the control module 200 recognizes the terminal 400 and tracks the terminal 400 in real time so that the terminal can be driven at the back by a set distance, and a second tracking driving mode 417 in which when the terminal 400 makes a request or a golfer who carries the terminal 400 enters a driving area from a driving restricted area, the control module 200 recognizes the request or entry and tracks the terminal 400. Accordingly, a golfer can selectively control the golf cart 100 by selectively setting the mode.

In this case, in the second tracking driving mode 417, if the terminal 400 carried by a golfer deviates from a driving restricted area or driving area stored in the memory unit 240 of the control module 200, the control module 200 stops the driving of the cart main body 100. If the terminal 400 subsequently enters the driving area again, when the golfer transmits a signal to the control module 200 using the terminal 400, the distance measurement unit 290 rapidly checks the location of the terminal 400 and drives the cart main body 100.

A method of controlling a golf cart using the aforementioned golf cart system is described below.

Figure 8:
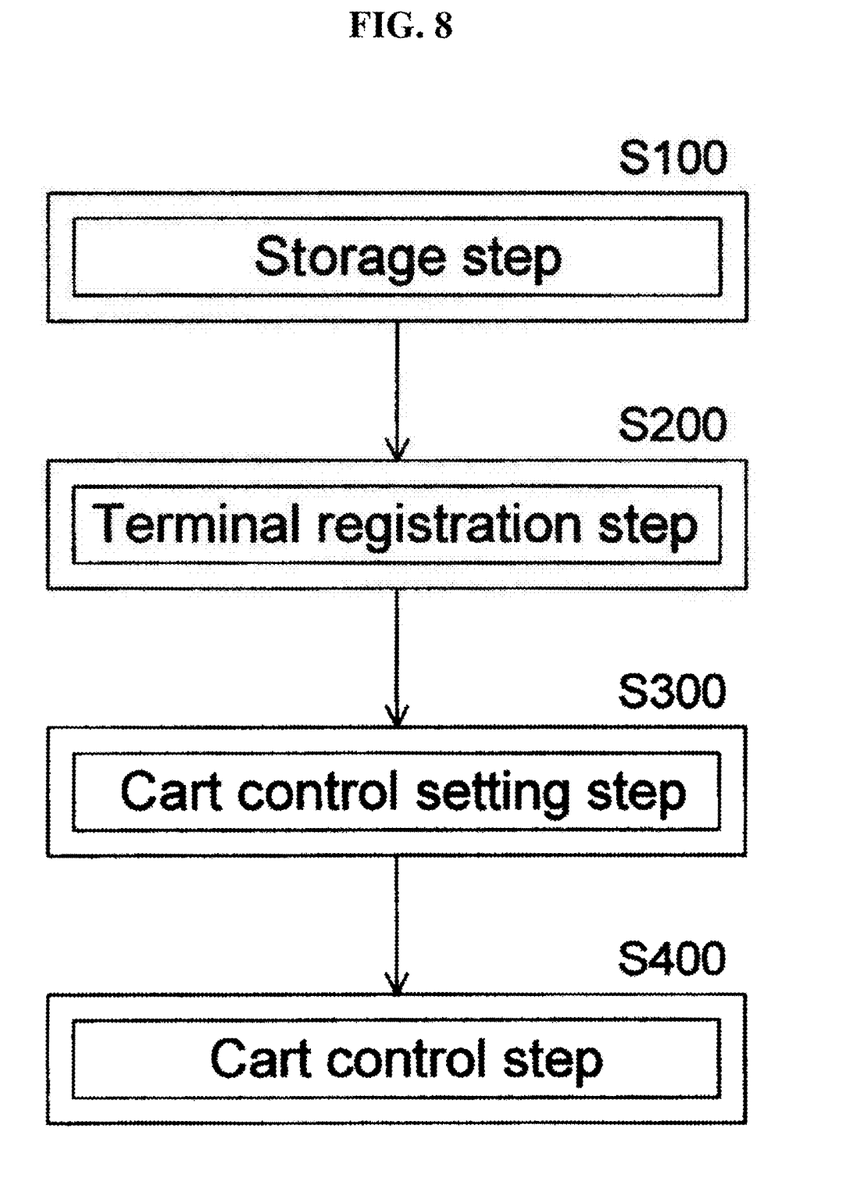
FIG. 8 is a flowchart of a cart control method according to an embodiment of the present invention.

As shown in FIG. 8, the method includes a storage step S100 of storing information of a field divided into a driving area and driving restricted area of a golf course and received from the server 300 in the memory unit 240; a terminal registration step S200 of selectively registering the terminal 400 capable of operating in conjunction with the control module 200 of the cart main body 100 and having the app 410 configured to select any one of the boarding driving mode 401a, the terminal driving mode 401b, the first tracking driving mode 401c and the second tracking driving mode 401d installed in the terminal 400 with the control module 200 of the cart main body 100; a cart control setting step S300 of selecting one of the modes using the app 410 of the terminal 400; and a cart control step S400 of controlling the cart main body 100 by the control module 200 according to a mode set in the cart control setting step S300.

In this case, in the cart control step S400, when the golfer or the terminal 400 deviates from the driving restricted area, the cart main body 100 is automatically stopped. When the golfer or the terminal 400 enters the driving area, the golfer manually drives the cart main body 100 or the control module 200 recognizes the terminal 400 and automatically drives the cart main body 100.

Furthermore, in the storage step S100, when information about the driving area or driving restricted area is suddenly changed, the changed field information is received from the server 300 and stored in real time.

In accordance with the method of controlling a golf cart according to the embodiment of the present invention, there is an effect in that in driving a golf cart in a golf course in which a golfer wants to play golf, the golf cart can be driven safely, rapidly and accurately based on field information because the field information of the golf course is previously stored before the golf cart is driven. Furthermore, there is an effect in that the control module 200 can accurately confirm a location if the terminal 400 when a signal is received again after a signal between the terminal 400 capable of immediately handling a situation and the control module 200 is disconnected because field information of a golf course is received in real time.

In accordance with the golf cart system capable of autonomous driving based on accurate location information and the method of controlling a golf cart using the system according to the embodiments of the present invention, the golf cart confirms the location of the terminal tracked in real time and thus can perform its original object. Furthermore, when the terminal enters the first location or enters a driving area again after it deviates from the driving area, the golf cart can confirm the location of the terminal, can confirm an accurate location of the terminal through the trilateration algorithm, and can move rapidly. Accordingly, the present invention is an useful invention capable of minimizing an error range because the golf cart can modify an error range in confirming the location of the terminal to minimize the error range when providing the location value of the terminal through the trilateration algorithm through which golfers can rapidly approach to the golf cart without waiting for a long time to provide the golfers with convenience.

What is claimed is:

1. A golf cart system capable of autonomous driving based on accurate location information, comprising:
   a cart main body;
   a control module configured to automatically drive the cart main body and including
   a collision prevention sensor configured to prevent a collision by recognizing a target,
   a GPS sensor configured to provide location information of the cart main body,
   a slope sensor configured to recognize and control a slope,
   a memory unit configured to store field information of a driving area and driving restricted area of a golf course,
   a tracking unit configured to track a terminal in real time,
   a control unit configured to receive location information of the terminal, to calculate a distance from the terminal based on the field information of the golf course stored in the memory unit and to control a movement of the cart main body,
   a communication module for transmission and reception with the terminal, and
   a distance measurement unit configured to measure a distance between the control module and the terminal;
   a server transmitting the field information of the golf course to the memory unit; and
   the terminal operating in conjunction with the control module selectively or in real time,
   wherein
   three or more fixed nodes are configured at locations spaced apart from one another on one side of the cart main body and are connected to the control module, wherein one of the fixed nodes is a reference of coordinates,
   the terminal is configured to perform signal transmission and reception with the control module at a round robin state,
   when the terminal transmits a first signal, the control module
   receives the first signal and retransmits the first signal if the number of checked fixed nodes after the first signal timeout of 100 ms is less than 3, and
   switches to the round robin state if the number of checked fixed nodes after the first signal timeout of 100 ms is 3 or more,
   the terminal is configured to transmit a second signal to the control module, receive a response to the second signal from the control module, and calculate a first time lag, if the response to the second signal is not received by the terminal within 10 ms after the second signal is transmitted, timeout is generated and round robin is restarted,
   the terminal is configured to transmit a third signal regarding a range information, receive a response to the third signal regarding the range from the control module, and calculate a second time lag, if the response to the third signal is not received within 10 ms after transmitting the third signal, timeout is generated and round robin is restarted, and the distance measurement unit is configured to sequentially calculate the distances between each of the fixed nodes and the terminal based on information of the first and second time lags at the round robin state, calculate an x,y coordinate value of the terminal by substituting a trilateration algorithm into the x,y coordinate value, determine the x,y coordinate value to be the location values of the terminal, calculate a distance l and angle Θ between the location value of the terminal and the fixed node of the reference, and transmit a result of the calculation to the control module so that the cart main body autonomously drives.

2. The golf cart system of claim 1, wherein:

the fixed nodes are divided and disposed at coordinates x,y, the fixed nodes comprise a first fixed node having the x,y coordinate value of 0,0 and being a reference point determining the distance l and angle Θ between the terminal and the cart main body, a second fixed node having the x,y coordinate value of 25, 25√3, and a third fixed node having the x,y coordinate value 50,0, the first fixed node is defined by x,y=x1,y1, the second fixed node is defined by x,y=x2,y2, and the third fixed node is defined by x,y=x3,y3, a calculation formula of the trilateration algorithm of the distance measurement unit comprises $$R1=\sqrt{(x-x_1)^2+(y-y_1)^2}$$

$$R2=\sqrt{(x-x_2)^2+(y-y_2)^2}$$

$$R3=\sqrt{(x-x_3)^2+(y-y_3)^2}, \text{ and}$$

the distance l and angle Θ between the first fixed node and the terminal which are location references of the cart main body are determined by substituting the distance values R1, R2 and R3 of the first, second and third fixed nodes and the terminal into the calculation formula of the trilateration algorithm.

3. The golf cart system of claim 1, wherein when the terminal carried by the golfer deviates from a set driving area, the cart main body is automatically stopped, when the terminal carried by the golfer enters the driving area, the control module recognizes a request from the golfer or automatically recognizes a signal from the terminal, and drives the cart main body toward the terminal, the terminal is a single terminal and the cart main body includes a plurality of cart main bodies, and the control unit is configured to receive location information of the single terminal, calculate a distance from the single terminal based on the field information of the golf course stored in the memory unit, and sequentially drive each of the plurality of cart main bodies in an order based on a distance of said each of the plurality of cart main bodies to the single terminal, wherein one of the plurality of cart main bodies having a distance closest to the single terminal is driven first, and another one of the plurality of cart main bodies having a distance furthest to the single terminal is driven last.

4. The golf cart system of claim 1, wherein:

an app for controlling the cart main body automatically or manually is installed in the terminal, and the app comprises:

a boarding driving mode in which a golfer drives the cart main body after boarding the cart main body, a terminal driving mode in which the cart main body is manually manipulated by the golfer via the terminal, a first tracking driving mode in which the control module recognizes the terminal and tracks the terminal in real time so that the terminal is driven at the back by a set distance, and a second tracking driving mode in which when the terminal makes a request or a golfer who carries the terminal enters a driving area from a driving restricted area, the control module recognizes the request or entry and tracks the terminal.

5. The golf cart system of claim 1, wherein the cart main body comprises:

a first pair of wheels spaced apart from each other at a first specific interval and located at a front of the cart main body, a second pair of wheels spaced from each other at a second specific interval and located at a rear of the cart main body, a motor drive driven under a control of the control unit and configured on one side of an inside of the cart main body, and left and right motors and connected to the respective wheels of the first pair of wheels configured at the front, and the control unit controls the motor drive through RS485 communication.

* * * * *